Feb. 5, 1935.  R. C. JACOBS  1,989,929

GLARE SHIELD FRAME

Filed Dec. 30, 1933

INVENTOR
REX C. JACOBS
BY
ATTORNEYS

Patented Feb. 5, 1935

1,989,929

UNITED STATES PATENT OFFICE 1,989,929

GLARE SHIELD FRAME

Rex. C. Jacobs, Detroit, Mich.

Application December 30, 1933, Serial No. 704,628

5 Claims. (Cl. 296—97)

The present invention pertains to a novel glare shield frame of the type particularly adapted for use in automobiles and like vehicles.

The primary object of the present invention is to provide a glare shield frame suitable for receiving an opaque covering so that the same may be mounted within an automobile with supporting means which permits the same to be easily and conveniently moved to various positions to intercept rays of light.

Another object of the present invention is to provide a metallic glare shield frame which is comparatively light, which is rugged and durable, and which may be inexpensively manufactured by welding the parts thereof.

Another object of the present invention is to improve the glare shield frame disclosed in my co-pending application Serial No. 664,919 filed April 7, 1933.

With the above and other ends in view the invention consists in matters hereinafter set forth and more particularly pointed out in the appended claims, reference being had to the accompanying drawing, in which Figure 1 is an elevation of a glare shield and support therefor;

Like characters of reference are employed throughout to designate corresponding parts.

Figure 1:
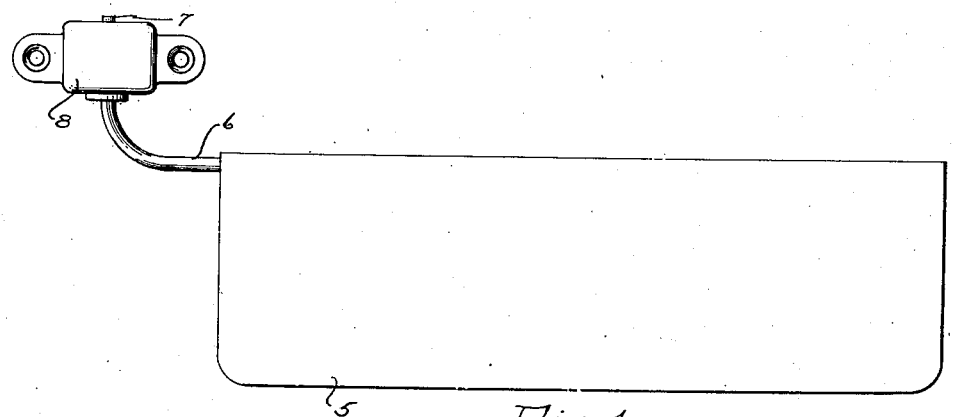
Figures 2, 3:
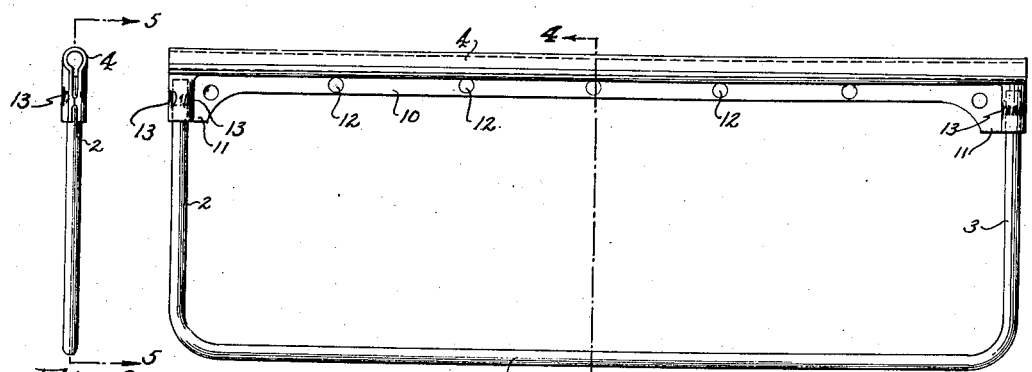
Fig. 2 is an edge view of the frame.
Fig. 3 is an elevation of the frame.
Figure 5:
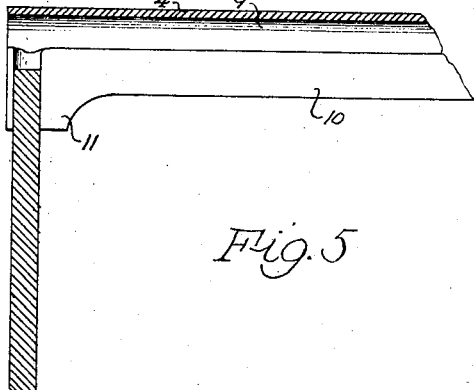
Fig. 5 is a cross section taken on the line 5—5 of Fig. 2.

The numeral 1 designates a straight run of a metal rod whose end portions are bent to form end runs 2 and 3 extending in a plane at right angles thereto. The two end runs are formed by a substantially tubular member generally designated by the numeral 4 to complete a substantially rectangular frame suitable for receiving an opaque covering. The frame is illustrated in Fig. 1 as being covered and the material 5 is preferably upholstering fabric which matches the upholstering of the automobile with which it is to be used.

The tubular member 4 receives a metal rod 6 so that the rectangular shield frame may be rotated around the rod, the longitudinal axis of the rod being the axis of rotation of the frame. As shown in my co-pending application Serial No. 664,919 various means may be provided to resist rotation of the frame around the rod so that it may be moved by manual pressure to any rotative position and the friction will hold it in the adjusted position. The rod 6 has a portion 7 bent at right angles to the longitudinal axis thereof, and this portion 7 is rotatably received in a bracket 8 which is adapted to be secured within an automobile in the manner shown in the referred to co-pending application. The rod 6 is adapted to be rotated in the bracket 8 and the axis of this rotative movement extends in a plane at right angles to the plane of the axis of rotation of the rectangular frame.

Figure 4:
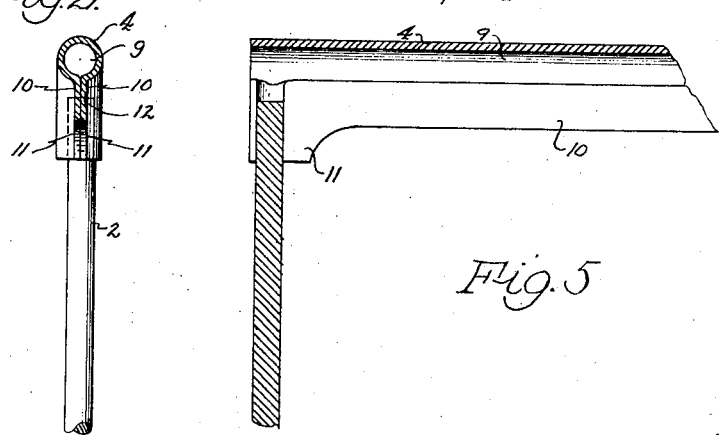
Fig. 4 is a cross section taken on the line 4—4 of Fig. 3.

The tubular portion of the frame which is generally designated by the numeral 4 comprises a flat sheet metal blank which is stamped or rolled or otherwise formed with a circular cross sectional shape more clearly shown in Fig. 4 and designated by the numeral 9. Contrary to the usual practice the metal forming the tube in this manner is not seam welded or lap welded together but is bent outwardly to extend in a radial direction as designated at 10. At each end the outwardly projecting portions 10 are formed with ears 11 between which the end runs 2 and 3 are received. Finally the projecting portions 10 are welded together as designated at 12 and the ears 11 are bent around the ends of the runs 2 and 3 to closely embrace the same and are welded thereto as indicated at 13.

When the frame of the shield is covered with fabric and mounted in an automobile as above described it is customary when the same is moved to various positions of adjustment to grasp the frame at any convenient point and apply the necessary manual pressure thereto in order to move the same. Inasmuch as considerable friction is necessary to prevent the relatively movable parts shifting of their own accord from an adjusted position it becomes necessary to exert considerable pressure on the frame. For this reason the frame must be strong and durable and the manner of forming the tubular portion with the projecting portions 10 reinforcing the same provides the necessary strength, especially in view of the rigidity of the connection provided for the end runs 2 and 3 with the tubular member.

An inexpensive method of providing sufficient friction between the tubular member and the supporting rod therefore is to make the rod wavy or provide it with projecting portions. This is disclosed in my referred to co-pending application Serial No. 664,919. In using a light weight tube with such a rod however it is found that the tube, after a period of use, becomes distorted like the rod and the necessary friction to prevent undesired rotation is not provided. The projecting portions 10 eliminate the possibility of the tube becoming distorted in such a manner.

Although a specific embodiment of the present invention has been illustrated and described it is to be understood that various changes may be made within the scope of the appended claims without departing from the spirit of the invention, and such changes are contemplated.

What I claim is:—

1. A glare shield frame comprising a tubular member, a rod having its ends bent to extend at an angle relative to said tubular member, and integral outwardly extending portions on said tubular member receiving the ends of said rods, said outwardly extending portions being welded to said ends of said rod, said rod terminating at each end short of the inner periphery of said tubular member whereby said tubular member may serve as a frictional hinge member.

2. A glare shield frame comprising a flat metal blank, said blank being bent intermediate its edges to form a closed circular cross section, the circular portion constituting a hinge member for a supporting rod along substantially its entire length, the metal adjacent the opposite edges being bent to lie flush against each other, said edges constituting a rigidifying means for said hinge member and being secured together, and a bent rod having its opposite ends secured to the ends of said edge portions.

3. A glare shield frame comprising a flat metal blank, said blank being bent intermediate its edges to form a circular cross section, the metal adjacent the opposite edges being bent to lie flush against each other, and being secured together to form a stiff rib, sleeve shaped integral portions on said edge portions substantially spaced from said circular cross section, and a bent rod having its ends received in said sleeve shaped portions and terminating short of the inner periphery of the circular portion of said blank.

4. A glare shield frame comprising a flat metal blank bent into a circular cross section with the longitudinal edges thereof extending radially therefrom in parallel relation and welded together, ears formed on said longitudinal edges in spaced relation with the interior of said circular section, a bent rod having its ends received between sets of said ears, said ears being bent around said ends to embrace the same and being welded thereto, the ends of said rod terminating short of the interior of said circular section whereby the entire length of said circular section is available as a frictional hinge member.

5. A glare shield frame comprising a tubular member having an uninterrupted circular interior adapted for use along its entire length as a frictional hinge member, a ribbing extending radially from and integral with said tubular member, said ribbing being spread at each end to form openings radially arranged with respect to said tubular member, a rod bent to constitute the remainder of the frame, the ends of said rod extending into said openings for attachment thereto, the ends of said rod being substantially spaced from the interior of said tubular member, the entire frame being adapted for covering by an envelope.

REX C. JACOBS.